US008821989B2

(12) United States Patent
Nishimori et al.

(10) Patent No.: US 8,821,989 B2
(45) Date of Patent: Sep. 2, 2014

(54) METHOD FOR MANUFACTURING OPTICAL LAMINATED BODY

(75) Inventors: Toshimasa Nishimori, Ibaraki (JP); Tadayuki Kameyama, Ibaraki (JP); Tooru Umemoto, Ibaraki (JP)

(73) Assignee: Nitto Denko Corporation, Ibaraki-shi, Osaka (JP)

( * ) Notice: Subject to any disclaimer, the term of this patent is extended or adjusted under 35 U.S.C. 154(b) by 520 days.

(21) Appl. No.: 12/811,000

(22) PCT Filed: Dec. 16, 2008

(86) PCT No.: PCT/JP2008/072853
§ 371 (c)(1), (2), (4) Date: Jun. 28, 2010

(87) PCT Pub. No.: WO2009/101747
PCT Pub. Date: Aug. 20, 2009

(65) Prior Publication Data
US 2010/0285242 A1  Nov. 11, 2010

(30) Foreign Application Priority Data

Feb. 13, 2008 (JP) ................................. 2008-032139

(51) Int. Cl.
*G02B 5/30* (2006.01)
(52) U.S. Cl.
CPC .................................... *G02B 5/3016* (2013.01)
USPC .......................................... 427/547; 427/598
(58) Field of Classification Search
None
See application file for complete search history.

(56) References Cited

U.S. PATENT DOCUMENTS

| | | | |
|---|---|---|---|
| 5,529,741 A * | 6/1996 | Rubin et al. | 264/435 |
| 5,739,296 A | 4/1998 | Gvon et al. | |
| 6,174,394 B1 | 1/2001 | Gvon et al. | |
| 2003/0047711 A1 | 3/2003 | Kawata et al. | |
| 2004/0215015 A1 | 10/2004 | Nazarov et al. | |
| 2005/0109986 A1 | 5/2005 | Dutova et al. | |
| 2006/0004112 A1* | 1/2006 | Shimoyama et al. | 521/27 |
| 2006/0028615 A1* | 2/2006 | Kumar et al. | 351/163 |
| 2007/0064177 A1* | 3/2007 | Itadani et al. | 349/98 |

FOREIGN PATENT DOCUMENTS

| | | |
|---|---|---|
| CN | 1875009 A | 12/2006 |
| EP | 1343025 A1 | 9/2003 |
| EP | 1881351 A1 | 1/2008 |
| JP | 8-511109 A | 11/1996 |
| JP | 2002-286936 A | 10/2002 |

(Continued)

OTHER PUBLICATIONS

Chinese Office Action dated Jul. 19, 2011, issued in corresponding Chinese Patent Application No. 200880126263.

(Continued)

*Primary Examiner* — Mandy Louie
(74) *Attorney, Agent, or Firm* — Westerman, Hattori, Daniels & Adrian, LLP (57) ABSTRACT

Provided is a method for manufacturing an optical laminated body having a substrate and a polarizing film that contains a lyotropic liquid crystal compound and is formed on the substrate. The method includes a step (A) of applying a coating liquid containing the lyotropic liquid crystal compound and a solvent onto the substrate and forming a coat film with the lyotropic liquid crystal compound orientated in one direction, and a step (B) of applying a magnetic field to the coat film in a direction substantially parallel to an orientation direction of the lyotropic liquid crystal compound.

6 Claims, 5 Drawing Sheets

(56) References Cited

FOREIGN PATENT DOCUMENTS

| | | |
|---|---|---|
| JP | 2002-294239 A | 10/2002 |
| JP | 2003-4948 A | 1/2003 |
| JP | 2003-195050 A | 7/2003 |
| JP | 2003-255127 A | 9/2003 |
| JP | 2005-154746 A | 6/2005 |
| JP | 2006-72273 A | 3/2006 |
| JP | 2006-526013 A | 11/2006 |
| JP | 2007-512236 A | 5/2007 |
| JP | 2007-298682 A | 11/2007 |
| JP | 2008-015118 A | 1/2008 |
| KR | 10-2003-0061435 A | 7/2003 |
| WO | 2005/051926 A1 | 6/2005 |
| WO | 2007/125696 A1 | 11/2007 |

OTHER PUBLICATIONS

Notification of Transmittal of Copies of Translation of the International Preliminary Report on Patentability (Form PCT/IB/338 of International Application No. PCT/JP2008/072853 mailed Sep. 16, 2010 with Forms PCT/IB1373 and PCT/ISA/237
Korean Office Action dated Oct. 24, 2011, issued in corresponding Korean Patent Application No. 10-2010-7017161.
International Search Report of PCT/JP2008/072853, Mailing Date of Mar. 24, 2009.
Japanese Office Action dated Nov. 6, 2012, issued in corresponding Japanese patent application No. 2008-032139, w/ English translation.
Notification of Ground for Rejection dated Jul. 17, 2012, issued in corresponding Japanese Patent Application No. 2008-032139.

* cited by examiner

METHOD FOR MANUFACTURING OPTICAL LAMINATED BODY

BACKGROUND OF THE INVENTION (1) Field of the Invention

The present invention relates to a method for manufacturing an optical laminated body that has a uniform film surface widely thereon without creating defects such as bright spots, black spots, etc.

(2) Description of the Related Art

As disclosed in JP Laid-open Patent Application Publication No. 2005-154746, there has conventionally been proposed a method for manufacturing an optical laminated body that has a substrate and a polarizing film including a lyotropic liquid crystal compound and being formed on the substrate, by applying an aqueous solution (coating liquid) containing the lyotropic liquid crystal including perylene based pigment and water onto the substrate, drying it and orientating it.

The polarizing film thus formed with the aqueous solution including a lyotropic liquid compound can reduce its film thickness significantly in comparison with a widely used polarizing film formed by staining polyvinyl alcohol with iodine and stretching it. Therefore, usefulness of the thus thinly formed polarizing film is highly expected in the feature.

Patent Document 1: JP Laid-open Patent Application Publication No. 2005-154746 (pp. 25-28)

BRIEF SUMMARY OF THE INVENTION

The liquid crystal compound used in the above conventional manufacturing method is actually orientated by applying orientation regulating force to the compound by means of shear-stress application, rubbing treatment and the like.

The conventional manufacturing method can orientate a lyotropic liquid crystal compound as long as it is within a tiny region of the polarizing film. The method, however, creates defects such as bright spots, black spots, etc. within a wide region of the polarizing film. Such defects prevent the conventional method from manufacturing a polarizing film in which the lyotropic liquid crystal compound is uniformly orientated, which is problematic.

Under the situations as described in the above, there has been desired to devise a method for manufacturing an optical laminated body that has a polarizing film with a film surface where a lyotropic liquid crystal compound is uniformly orientated without creating defects such as bright spots, black spots, etc. widely on the film surface.

Inventors and the related staff of the present invention have made every effort to search into the cause of bright spots, black spots, etc. on an optical laminated body manufactured in accordance with the conventional manufacturing method thereof. The result of their effort on the search has found that defects such as bright spots, black spots, etc. occur when various convex particles (represented as foreign particles, anti-blocking fillers, etc.) are present on a substrate. More specifically, at an interface where a convex particle and a coat film are in touch, defective orientation occurs to a lyotropic liquid crystal compound that is being applied for coating. Subsequently, the defective orientation spreads over the whole portion above the convex particle and finally emerges up on a film surface of the optical laminated body.

The present invention has been made to resolve the above-described conventional problem and the object of the present invention is to provide a method for manufacturing an optical laminated body that has a polarizing film with a film surface where a lyotropic liquid crystal compound is uniformly orientated without creating defects such as bright spots, black spots, etc. at a wide region of the coat film coated with the lyotropic liquid crystal compound.

To achieve the above object, the present invention provides a method for manufacturing an optical laminated body having a substrate and a polarizing film that contains a lyotropic liquid crystal compound and is formed on the substrate, the method comprising: a step (A) of applying a coating liquid containing the lyotropic liquid crystal compound and a solvent onto the substrate and forming a coat film with the lyotropic liquid crystal compound orientated in one direction; and a step (B) of applying a magnetic field to the coat film in a direction substantially parallel to an orientation direction of the lyotropic liquid crystal compound.

In a preferable embodiment, it is preferable that the coating liquid exhibits a liquid crystal phase.

In a preferable embodiment, it is preferable that the coating liquid is applied onto the substrate while shear stress is applied to the coating liquid at the step (A).

In a preferable embodiment, it is preferable that an application direction of the coating liquid at the step (A) and an application direction of the magnetic field at the step (B) are at substantially right angles to each other.

In a preferable embodiment, it is preferable that the magnetic field is applied to the coat film at the step (B) on condition that the coat film contains 20% by weight or more of the solvent.

In a preferable embodiment, it is preferable that strength of the magnetic field at the step (B) is from 0.5 tesla to 12 tesla.

After a coating liquid containing the lyotropic liquid crystal compound and a solvent is applied onto the substrate so as to form a coat film with the lyotropic liquid crystal compound orientated in one direction, a magnetic field is further applied to the coat film in a direction substantially parallel to an orientation direction of the lyotropic liquid crystal. As a result, there can be realized a method for preventing defective orientation from spreading widely on the film even when the defective orientation occurs at an interface where the substrate and the coat film are in touch. Therefore, the method makes it possible to manufacture an optical laminated body that has a polarizing film with a film surface where a lyotropic liquid crystal compound is uniformly orientated.

EXPLANATION OF REFERENCES 1 substrate
2 lyotropic liquid crystal compound
3 coating-liquid application direction 4 polarizing film
5 convex particle
6 defect
7 magnetic-field application direction

DETAILED DESCRIPTION OF THE INVENTION

Outline of the Present Invention

The inventive method for manufacturing an optical laminated body having a substrate and a polarizing film that contains a lyotropic liquid crystal compound and is formed on the substrate, the method comprises: a step (A) of applying a coating liquid containing the lyotropic liquid crystal compound and a solvent onto the substrate and forming a coat film with the lyotropic liquid crystal compound orientated in one direction; and a step (B) of applying a magnetic field to the coat film in a direction substantially parallel to an orientation direction of the lyotropic liquid crystal compound.

The above mentioned method for manufacturing an optical laminated body is to realize manufacturing of an optical laminated body that has a polarizing film with a film surface where a lyotropic liquid crystal compound is uniformly orientated. More specifically, even when defective orientation of the lyotropic liquid crystal compound occurs at an interface where a convex particle and a coat film are in touch due to presence of the convex particle represented as foreign particle, anti-blocking filler and the like on the substrate, the method prevents the defective orientation of the lyotropic liquid crystal compound from spreading on the whole upper portion of the convex particle.

There will be described on occurrence mechanism of defects such as bright spots, black spots, etc. due to presence of a convex particle and mechanism for resolving occurrence of defects such as bright spots, black spots, etc. due to presence of a convex particle on the polarizing film included in the optical laminated body manufactured with the inventive manufacturing method, by referring to FIG. 1A and FIG. 1B.

Figure 1A:
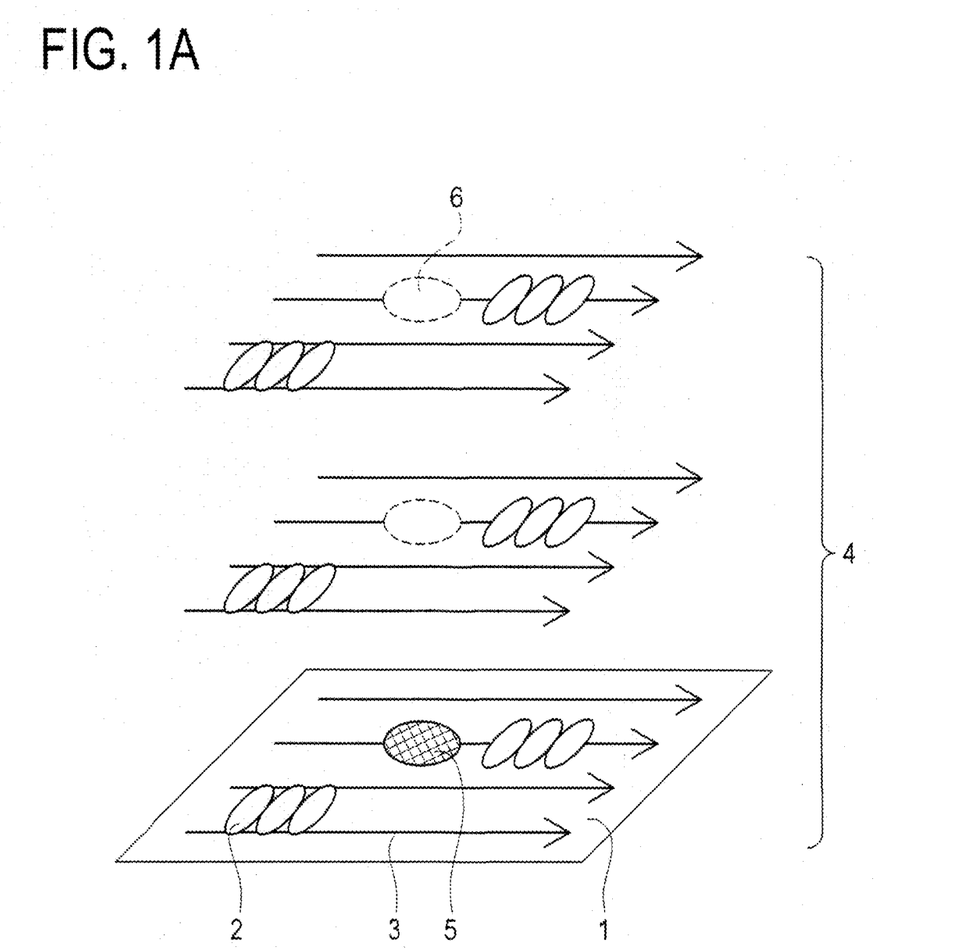
FIG. 1A is an explanatory view showing mechanism that defects such as bright spots, black spots, etc. due to presence of a convex particle occur on a polarizing film included in an optical laminated body manufactured in accordance with the manufacturing method directed to the present invention.
Figure 1B:
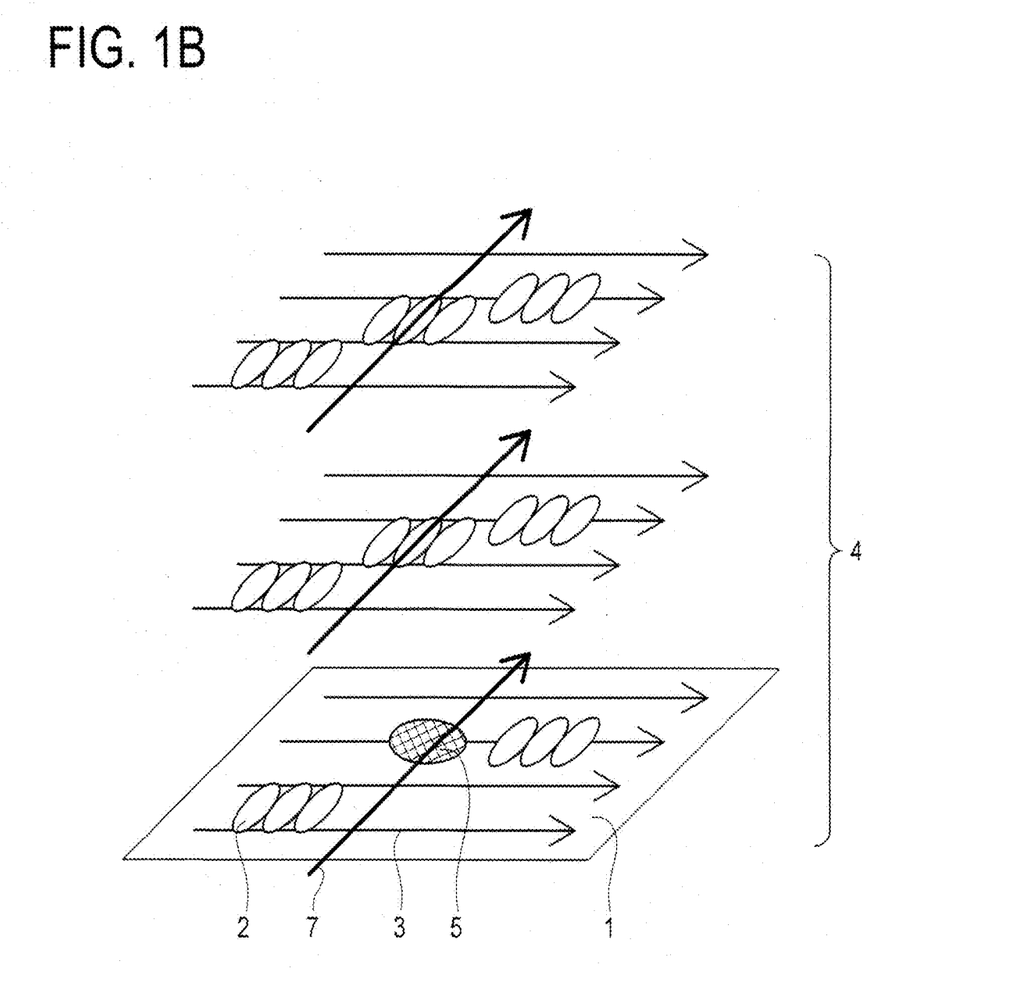
FIG. 1B is an explanatory view showing mechanism that occurrence of defects such as bright spots, black spots, etc. due to presence of a convex particle on the polarizing film are resolved.

FIG. 1A is an explanatory view showing mechanism that defects such as bright spots, black spots, etc. due to presence of a convex particle occur on a polarizing film included in an optical laminated body manufactured in accordance with the manufacturing method directed to the present invention. FIG. 1B is an explanatory view showing mechanism that occurrence of defects such as bright spots, black spots, etc. due to presence of convex particles on the polarizing film are resolved.

First, there will be described on the occurrence mechanism of defects such as bright spots, black spots, etc. due to presence of a convex particle, by referring to FIG. 1A. A coating liquid containing a lyotropic liquid crystal compound 2 is applied onto a substrate 1 in a coating-liquid application direction 3. Thereby, the lyotropic liquid crystal compound 2 forms plural associations in a supermolecular form and is orientated in a direction orthogonally crossing the coating-liquid application direction 3a so as to subsequently become plural liquid-crystal-layered coat films which make up of the polarizing film 4.

In case a convex particle 5 represented as a foreign particle, an anti-blocking filler or the like is present on the substrate 1 at this stage, defective orientation of the lyotropic liquid crystal compound 2 occurs to a liquid crystal layer on the substrate 1 at a position corresponding to the convex particle 5. Further, defective orientation due to the convex particle 5 transmits physically to an immediately upper liquid crystal layer. This defective orientation transmits in series up to another upper liquid crystal layers. As a result, defects 6 such as bright spots, black spots, etc. are formed on the polarizing film 4 at positions vertically corresponding to the position on the substrate 1 where the convex particle 5 is present.

Next, there will be described on mechanism that occurrence of defects such as bright spots, black spots, etc. due to presence of convex particles on the polarizing film are resolved, by referring to FIG. 1B. Similarly with the foregoing case, a coating liquid containing a lyotropic liquid crystal compound 2 is applied onto a substrate 1 in a coating-liquid application direction 3. Thereby, the lyotropic liquid crystal compound 2 forms plural associations in a supermolecular form and is orientated in a direction orthogonally crossing the coating-liquid application direction 3 so as to subsequently become plural liquid-crystal-layered coat films which make up of a polarizing film 4.

In case a convex particle 5 represented as a foreign particle, an anti-blocking filler and the like is present on the substrate 1 at this stage, defective orientation of the lyotropic liquid crystal compound 2 is subject to occur to a liquid crystal layer formed on the substrate 1 at a position corresponding to the convex particle 5. However, by applying a magnetic field in a magnetic-field application direction 7 that is substantially parallel to the orientation direction of the lyotropic liquid crystal compound 2 with securing mobility of the lyotropic liquid crystal compound 2 contained in the coat film together with a solvent, the lyotropic liquid crystal compound 2 included in the liquid crystal layer is orientated in a direction parallel to the magnetic-field application direction 7 and the lyotropic liquid crystal compound 2 included in an immediately upper crystal layer is also orientated in the direction parallel to the magnetic-field application direction 7. With this manner, the lyotropic liquid crystal compound 2 is orientated in series up to another upper liquid crystal layers in the direction parallel to the magnetic-field application direction 7. As a result, even when defective orientation of the lyotropic liquid crystal compound occurs at the interface where the coat film and the convex particle 5 are in touch due to the convex particle 5 present on the substrate 1, the defective orientation is prevented from spreading on the whole upper part of the convex particle 5. Thereby, occurrence of defects such as bright spots, black spots, etc. due to the convex particle 5 is resolved.

The above-described manufacturing method of an optical laminated body may include other optional step as well as the steps (A) and (B). For instance, at least after forming a coat film of a lyotropic liquid crystal compound, the manufacturing method may include a step of drying the coat film before and/or after applying a magnetic field.

[Optical Laminated Body]

An optical laminated body manufactured by the inventive manufacturing method has a substrate and a polarizing film that contains a lyotropic liquid crystal compound and is formed on the substrate. Thickness of the optical laminated body is not particularly restricted, however, preferable thickness is from 10 μm to 0.1 mm.

(a) Substrate

Configuration of a substrate used in the inventive manufacturing method is not particularly restricted. The substrate may be either a single layered body or a multi layered body (e.g., a resin film including an orientated film). The above-mentioned substrate is used for uniformly applying the coating liquid thereto. As particular examples of such substrate, there can be used a glass substrate, a quartz substrate, a polymer film, a plastic substrate, a metallic plate such as aluminum, iron or the like, a ceramic substrate or a silicon wafer, etc., from which an appropriate substrate is arbitrarily selected and used. Further, regarding methods of applying and drying the coating liquid in forming a polarizing film, appropriate methods can be arbitrarily adopted.

Various kinds of convex particles are likely to be present on the substrate adhering to and poking out from the substrate's surface. For instance, various kinds of convex particles could be adhesive foreign particles such as dust, dirt, metallic powder, etc. or an anti-blocking filler or the like that is used in case the substrate is a resin film.

Size of a convex particle is preferably from 1 μm to 50 μm and more preferably, from 1 μm to 30 μm Thickness of a substrate is not particularly restricted, however, preferable thickness is from 5 μm to 700 μm. It is preferable that the substrate is a transparent one and exhibits 90% or higher transmittance ratio under wavelength of 590 nm.

(b) Polarizing Film

A polarizing film contains a lyotropic liquid crystal compound. The polarizing film herein contains a lyotropic liquid crystal compound in a range from 50% to 100% by weight. The polarizing film exhibits dichroism with a wavelength in a visible light region (from 380 nm to 780 nm). It is preferable that dichroic ratio of the polarizing film is 1 or higher. Thickness of the polarizing film is not particularly restricted, however, preferable thickness is from 0.2 μm to 1.2 μm.

[Step (A)]

The above-mentioned step (A) is a step of applying a coating liquid containing a lyotropic liquid crystal compound and a solvent onto the substrate and forming a coat film with the lyotropic liquid crystal compound orientated in one direction.

(a) Coating Liquid

A type of a coating liquid used in the present invention is not particularly restricted as long as containing a lyotropic liquid crystal compound and a solvent. The coating liquid may contain an arbitrary additive such as surface acting agent, antistatic agent, antioxidizing agent, etc. Contained amount of the above such additives is more than 0 part and 10 parts or below by weight with reference to 100 parts by weight of a lyotropic liquid crystal compound.

It is preferable to use a coating liquid that exhibits a liquid crystal phase. It is preferable that the total concentration of the lyotropic liquid crystal compound in a coating liquid is from 0.1% to 10% by weight.

Here, in case of a single kind of a lyotropic liquid crystal compound in the coating liquid, "total concentration" is referred to as concentration of the single kind of the compound, and in case of two or more kinds of lyotropic liquid crystal compounds in there, "total concentration" is referred to as sum of concentration of the all kinds of lyotropic liquid crystal compounds.

(b) Lyotropic Liquid Crystal Compound

In the present invention, a lyotropic liquid crystal compound is referred to as a compound which causes a phase transition between an isotropic phase and a liquid crystal phase when the compound is in a dissolved state by changing temperature, solution concentration, and the like. Types of liquid crystal phases are not particularly restricted; a nematic liquid crystal phase, a smectic liquid crystal phase, cholesteric liquid crystal phase, etc., can be taken as examples. The foregoing liquid crystal phases can be identified by optical patterns of their own observed with a polarizing microscope.

It is preferable to use a lyotropic liquid crystal compound that exhibits light absorption characteristics with certain wavelength existing in a visible light region. It is preferable that a lyotropic liquid crystal compound is an azo based compound, an anthraquinone based compound, a perylene based compound, a quinophthalone based compound, a naphtoquinone based compound or a merocyanine based compound. Each of the above-mentioned compounds exhibits liquid-crystalline characteristics (lyotropic liquid crystal characteristics) in a state of a solution and absorption dichroism. In addition, each of those compounds forms supermolecular associations in a state of a solution so as to possess excellent orientation characteristics by a magnetic field.

[Solvent]

Kind of a solvent is not particularly restricted as long as it is a solvent capable of dissolving a lyotropic liquid crystal compound. Specifically, it is preferable that the solvent is a hydrophilic solvent. Water, alcohol or cellosolve, etc. can be taken as examples of the hydrophilic solvent.

(C) Means for Applying Coating Liquid

There is no particular restriction regarding means for applying a coating liquid onto the substrate; an arbitrary coater may be used. It is preferable that the coating liquid is applied onto the substrate while shear stress is applied to the coating liquid at the step (A). By applying a coating liquid to the substrate in accordance with the above manner, a polarizing film with high dichroism can be obtained.

(d) Coat Film

With respect to the coat film thus formed by applying the coating liquid onto the substrate, a lyotropic liquid crystal compound contained therein is orientated in one direction. As the means for orientating a lyotropic liquid crystal compound, applying shear stress to the coating liquid, applying the coating liquid onto a substrate that has been subjected to an orientation treatment and the like are taken as examples.

Thickness of the coat film is preferably from 0.2 μm to 10 μm, more preferably, from 0.2 μm to 5 μm. It is preferable that the coat film contains a solvent. Contained amount of the solvent in the coat film is preferably 20% or more by weight with reference to total weight of the coat film, more preferably from 20% to 95% by weight. The above-specified conditions bring the lyotropic liquid crystal compound contained in the coat film excellent orientation characteristics by orientation regulating force of a magnetic field, whereby a polarizing film with excellent dichroism can be obtained.

[Step (B)]

The above-mentioned step (B) is a step of applying a magnetic field to the coat film in a direction substantially parallel to an orientation direction of the lyotropic liquid crystal compound. Here, "orientation direction of the lyotropic liquid crystal compound" is referred to as direction that maximizes light absorption in a surface of the polarizing film owing to orientation of the lyotropic liquid crystal compound (so-called, absorption-axis direction).

In case the lyotropic liquid crystal compound exhibits flow orientation characteristics to orientate in an orthogonal direction with reference to the coating-liquid application direction, it is preferable that a magnetic-field application direction and the coating-liquid application direction at the step (A) are at substantially right angles to each other. On the other hand, in case the lyotropic liquid crystal compound exhibits flow orientation characteristics to orientate in a parallel direction with reference to the coating-liquid application direction, it is preferable that a magnetic-field application direction and the coating-liquid application direction at the step (A) are substantially parallel to each other.

By making the orientation direction of the lyotropic liquid crystal compound conform to the magnetic-field application direction, orientation regulating force of the lyotropic liquid crystal compound and that of the magnetic field are enhanced for each other. Thereby, there can be obtained a polarizing film that has a little number of defects such bright spots, black spots, etc. and exhibits even higher dichroism.

Here, "substantially right angle to each other" includes cases where the magnetic-field application direction is within a range of 90°±5° with reference to the coating-liquid application direction that is regarded as 0°, and "substantially parallel to each other" includes cases where the magnetic-field application direction is within a range of 0°±5° with reference to the coating-liquid application direction that is regarded as 0°.

Further, means for applying a magnetic field is not particularly restricted. For instance, a permanent magnet, an electric magnet, a superconducting magnet, arbitrary magnetic field generating means equipped with a coil and the like are applicable. Magnetic field strength (magnetic flux density) is preferably from 0.5 to 20 tesla, more preferably from 6 to 12 tesla. The larger magnetic field strength is, the higher dichroism of a polarizing film can be.

In case magnetic field is under 0.5 tesla, it is difficult to orientate the lyotropic liquid crystal compound sufficiently. On the other hand, it is almost impossible in a practical sense to gain magnetic field strength exceeding 20 tesla. In case magnetic field strength is within the above-specified preferable range, a polarizing film with a little number of defects such as bright spots, block points, etc. can be obtained and the range is practical for manufacturing.

Temperature when applying a magnetic field is preferably from 15° C. to 30° C., more preferably from 20° C. to 25° C.

[Utilization]

The optical laminated film thus formed is suitable for use in a liquid crystal display device. Regarding a liquid crystal display, there can be taken a display monitor for personal or laptop computer, photocopy machine or the like as examples.

Example

In this example, a coating liquid (A) has been obtained by adjusting water content of an aqueous solution containing a lyotropic liquid crystal compound (product name "NO15" by Optiva Inc.) so that concentration of the lyotropic liquid crystal compound therein should be 7% by weight.

The coating liquid (A) exhibits a nematic liquid crystal phase at room temperature (23° C.).

Figure 2:
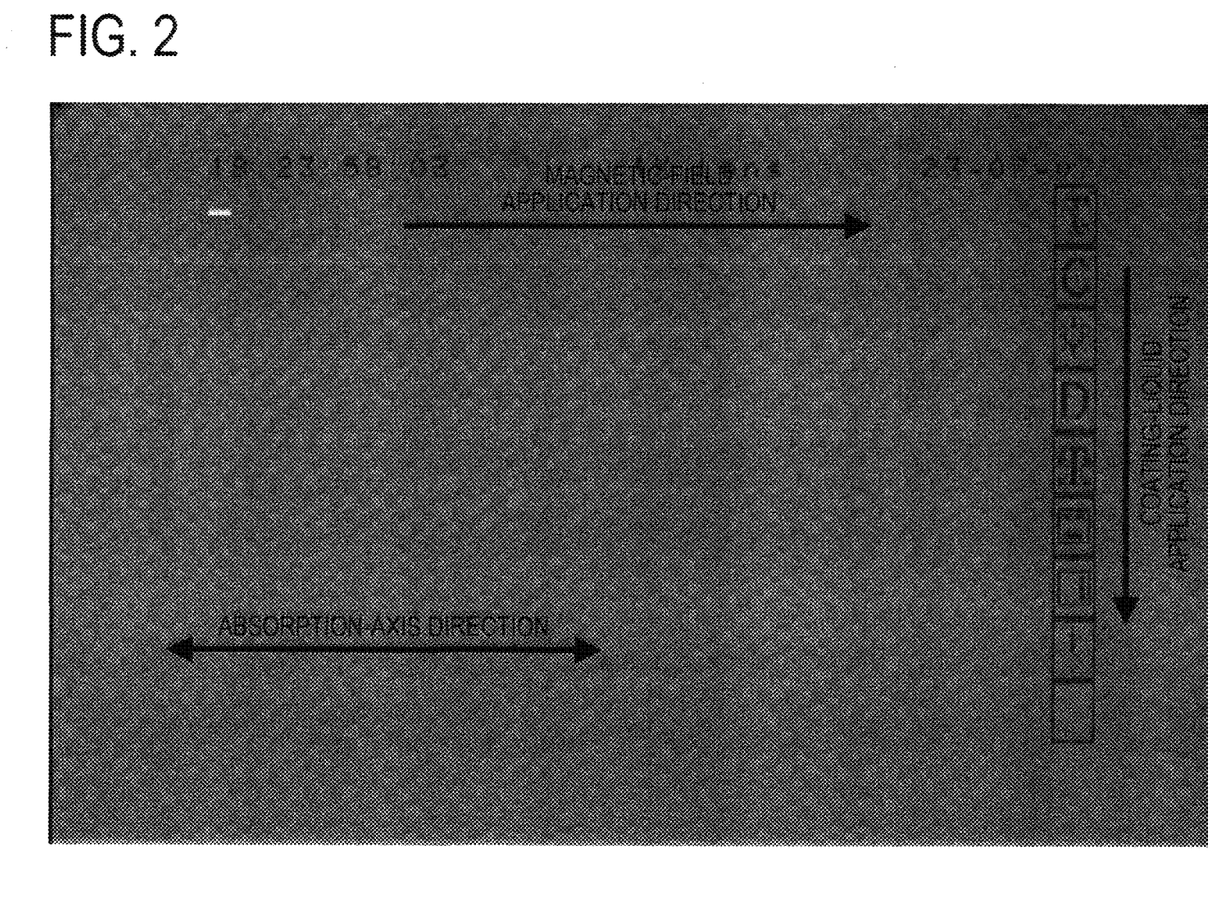
FIG. 2 is a polarizing microscope photograph of a polarizing film directed to an example.

The coating liquid (A) is applied onto a surface of a glass slide (product of Matsunami Glass Ind., Inc., size of 50 mm×45 mm, thickness of 0.7 mm) in an MD (Mechanical Direction), wherein the glass slide has been subjected to a corona treatment (surface charge treatment) thereon previously. Then, a coat film in which a lyotropic liquid crystal compound is orientated in a TD (transverse direction) is formed on the glass slide. Next, the laminated body consisting of the coat film and a glass plate is placed in a magnetic field applying machine (product name "freezer conduction cooling type 12 T magnet" by Japan Superconductor Technology). In there, a magnetic field of 12 tesla is applied to the coat film (containing 93% by weight of a solvent therein) in a direction substantially parallel to orientation direction (TD) of the lyotropic liquid crystal compound for ten minutes and thereafter, the coat film is air-dried. The thus obtained polarizing film (thickness of 0.4 μm) has an absorption axis in TD as shown in Table 1 below and has no defects such as bright spots, black spots, etc. as shown in FIG. 2.

TABLE 1

| | coating-liquid appln. direction | magnetic-field appln. direction | direction of absorption-axis | appearance |
|---|---|---|---|---|
| Example | MD | TD | TD | uniform (photo 1) |
| Comparative Example 1 | MD | No application of magnetic field | TD | defects present (photo 2) |
| Comparative Example 2 | MD | MD | MD | defects in orientation direction (photo 3) |

MD: Mechanical Direction (longitudinal direction)
TD: Direction orthogonal to MD (longitudinal direction) on surface Comparative Example 1

Other than omitting application of a magnetic field, a polarizing film of the comparative example 1 is manufactured similarly with the manufacturing method of the foregoing example. The thus obtained polarizing film has an absorption axis in TD as shown in Table 1 and has considerable defects such as bright spots, black spots, etc. as encircled in FIG. 3.

Comparative Example 2

Figure 4:
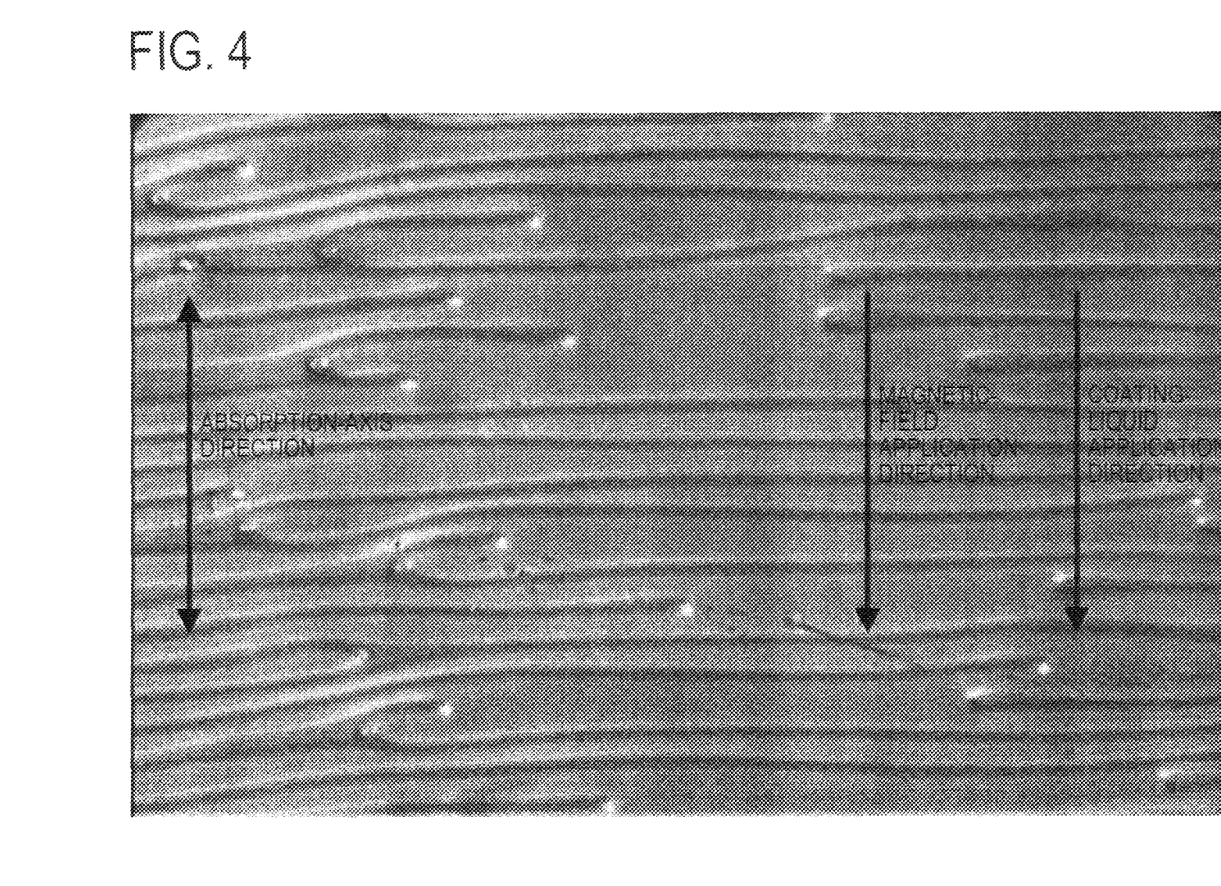
FIG. 4 is a polarizing microscope photograph of a polarizing film directed to a comparative example 2.

Other than application of a magnetic field in a direction parallel to the coating-liquid application direction (MD), a polarizing film of the comparative example 2 is manufactured similarly with the manufacturing method of the foregoing example. The thus obtained polarizing film has an absorption axis in MD as shown in Table 1 and gets considerable zebra-like defective orientation as shown in FIG. 4.

[Evaluation]

As the example indicates, with application of a magnetic field onto a coat film in a direction parallel to the orientation direction of the lyotropic liquid crystal compound, a polarizing film which has an absorption axis in TD and no defects such as bright spots, black spots, etc. observed is obtained.

On the other hand, as the comparative example 1 indicates, with no magnetic field application onto a coat film, a polarizing film which has an absorption axis in TD and considerable defects such as bright spots, black spots, etc. observed is obtained.

Further, as the comparative example 2 indicates, with application of a magnetic field onto a coat film in a direction orthogonal to the orientation direction of the lyotropic liquid crystal compound, a polarizing film which has an absorption axis in MD and considerable orientation defects observed is obtained. The cause of such considerable defective orientation is speculated that a magnetic field is applied in MD to the lyotropic liquid crystal compound in the comparative example 2 which has the flow orientation characteristics in TD, whereby orientation regulating forces of the lyotropic liquid crystal compound and that of the magnetic field are canceled each other out.

Regarding Table 1, thickness of respective films is measured with an FE-SEM (product name "S-4800" by Hitachi).

Figure 3:
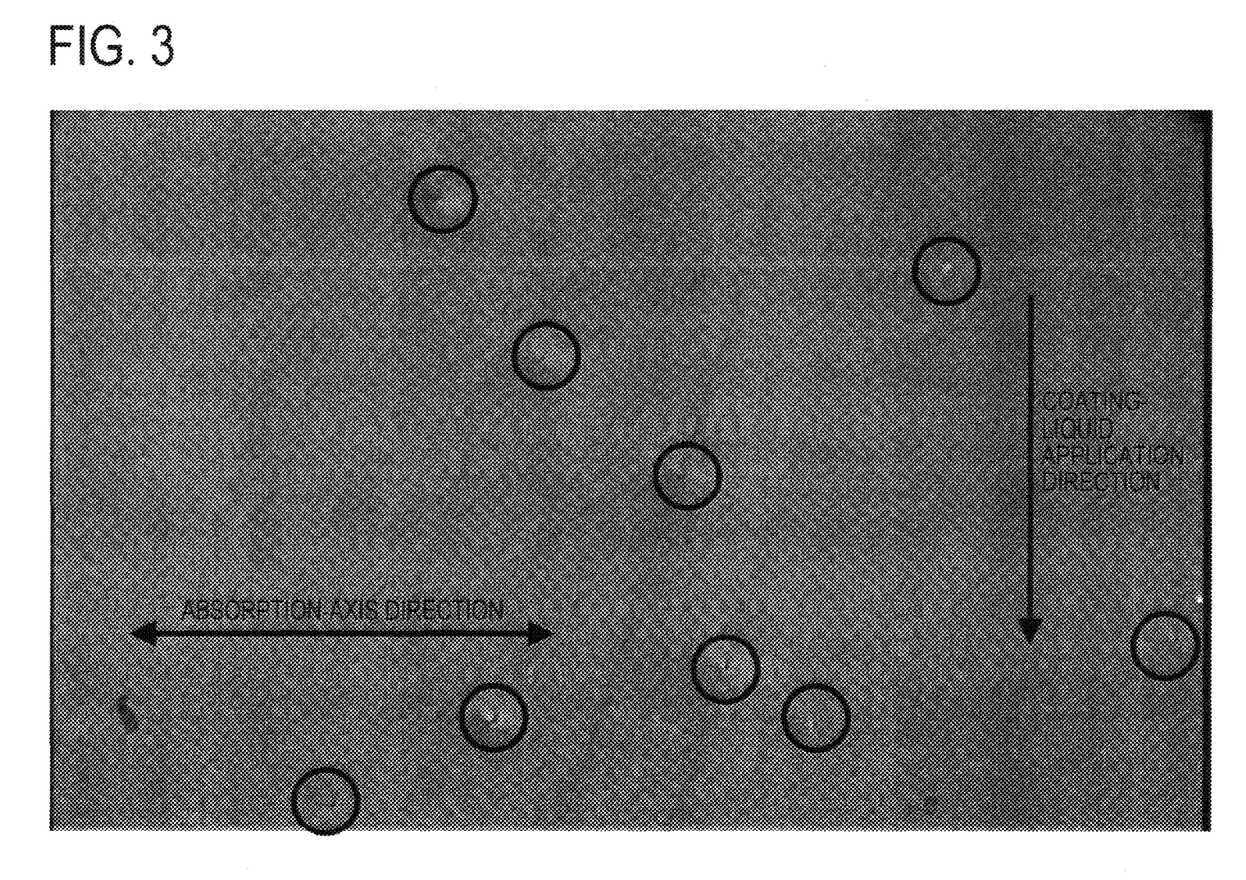
FIG. 3 is a polarizing microscope photograph of a polarizing film directed to a comparative example 1.

Further, regarding defective orientation, a polarizing microscope (product name "XTP-11" by Nikon) employing an eye lens of 10 magnifications and an objective lens of 10 magnifications is used for observing a state of each case when an absorption axis of a coat film and the polarizer of the microscope are made to cross each other by 15°. FIG. 2 through FIG. 4 are photos taken by a camera attached to the microscope.

INDUSTRIAL APPLICABILITY

As described, the inventive method for manufacturing an optical laminated body makes it possible to prevent defective orientation from spreading widely on the film even when the defective orientation occurs at an interface where the substrate and the coat film are in touch. Thereby, the method makes it possible to manufacture an optical laminated body including a polarizing film that has a film surface where a lyotropic liquid crystal compound is uniformly orientated. The optical laminated body thus formed is highly useful in, for example, the development of display quality of a liquid crystal display device.

The invention claimed is:

1. A method for manufacturing an optical laminated body having a substrate and a polarizing film that contains a lyotropic liquid crystal compound and is formed on the substrate, the method comprising:
   a step (A) of applying a coating liquid containing the lyotropic liquid crystal compound and a solvent onto the substrate and forming a coat film with the lyotropic liquid crystal compound orientated in an orthogonal direction with reference to a coating direction of the coating liquid; and
   a step (B) of applying a magnetic field to the coat film in a direction substantially orthogonal direction with reference to the coating direction of the coating liquid, whereby the magnetic field is applied substantially parallel to an orientation direction of the lyotropic liquid crystal compound to obtain a film surface where a lyotropic liquid crystal compound is uniformly orientated,
   wherein defective orientation of the lyotropic liquid crystal compound existing in the coat film is prevented from spreading widely, through step (B).

2. The method for manufacturing the optical laminated body according to claim 1, wherein the coating liquid exhibits a liquid crystal phase.

3. The method for manufacturing the optical laminated body according to claim 1, wherein the coating liquid is applied onto the substrate while shear stress is applied to the coating liquid at the step (A).

4. The method for manufacturing the optical laminated body according to claim 1, wherein the magnetic field is applied to the coat film at the step (B) on condition that the coat film contains 20% by weight or more of the solvent.

5. The method for manufacturing the optical laminated body according to claim 1, wherein strength of the magnetic field at the step (B) is from 0.5 tesla to 12 tesla.

6. The method for manufacturing the optical laminated body according to claim 1, wherein in step (B), the magnetic field is applied in an in-plane direction.

* * * * *